E. C. MERSHON.
SAW SET.
APPLICATION FILED FEB. 24, 1910.
1,041,321.
Patented Oct. 15, 1912.
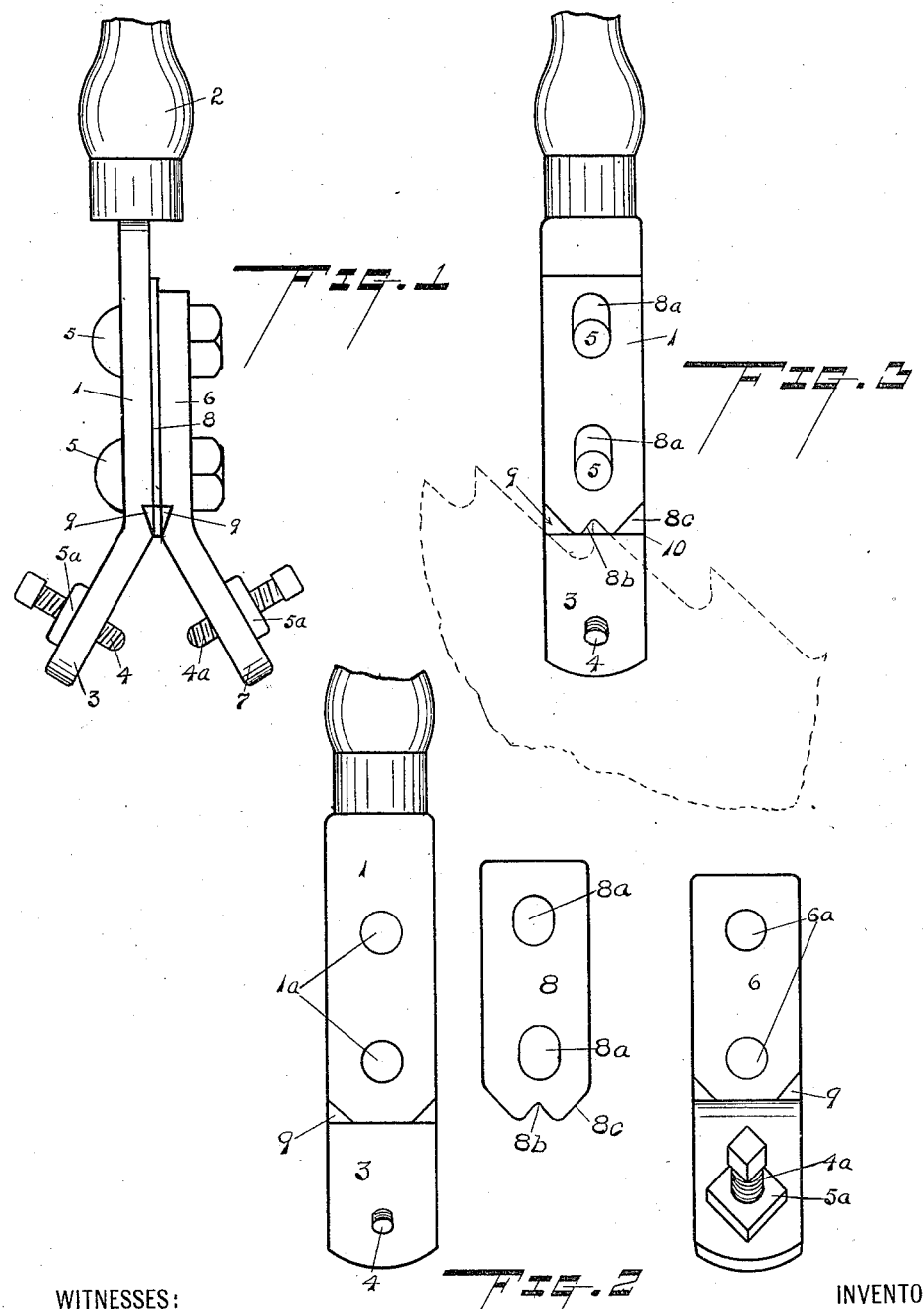

UNITED STATES PATENT OFFICE.

EDWARD C. MERSHON, OF SAGINAW, MICHIGAN, ASSIGNOR TO WM. B. MERSHON & CO., OF CARROLLTON, MICHIGAN, A CORPORATION OF MICHIGAN.

SAW-SET.

1,041,321. Specification of Letters Patent. Patented Oct. 15, 1912.

Application filed February 24, 1910. Serial No. 545,678.

*To all whom it may concern:*

Be it known that I, EDWARD C. MERSHON, a citizen of the United States, residing at Saginaw, in the county of Saginaw and State of Michigan, have invented certain new and useful Improvements in Saw-Sets; and I do hereby declare the following to be a full, clear, and exact description of the invention, such as will enable others skilled in the art to which it appertains to make and use the same.

This invention relates to saw sets and the object is to provide a saw set which will give proper side clearance to each tooth of the saw blade while preserving the initial strength of the steel at the extreme corners of the saw teeth after the teeth have been "set" or bent outwardly.

My invention is especially adapted to those saws having teeth rather too fine for "swaging" and coarser than teeth that may be "sprung" set by the appliances usually used for setting hand saws.

When a swage is used, the resulting compression of the steel of the tooth tends in a measure to disintegrate it and to break the corners of the teeth. This is especially liable to occur when the forming of the swaged points of the teeth is accomplished by dies or what are technically termed pressure side dressers or tooth formers.

When pressure side dressers are used, the double treatment of first expanding or spreading the point of the tooth by pressing the steel and then pressing back the surplus steel so as to give the correct amount of set, tends to injure the steel and to crumble the corners of the teeth, consequently presenting an improperly formed tooth to the timber being cut. When the second method of setting is employed, a wrench is used to pry or bend each alternate tooth to one side or the other. Such wrench must necessarily bend the tooth at a point down or well away from the extremity of the tooth, and as there is usually no means to gage the amount of bend given to the tooth, the operation of bending is necessarily slow and there is considerable liability that one tooth will be bent too much and another not enough. With such setting means, the correct amount to which each tooth should be bent is determined by an instrument or gage held over the side of the saw by hand, the operator thus determining whether the tooth has been bent too much or not enough, and guiding himself, so far as is possible, in correcting the difference in deflection of the various teeth to make them conform to this gage.

To overcome the disadvantages as above set forth, encountered in the use of setting devices, I have produced the saw set illustrated in the accompanying drawings, in which—

Figure 1 is a front elevation of the saw set, the handle being broken away, Fig. 2 is a side view of the parts comprising the setting device, and Fig. 3 is a side view of one-half of the set, the relative position of the set and the saw being indicated by the dotted lines.

The saw set consists in a flat bar 1 secured at its upper end to the handle 2 and having its lower end bent outwardly at an angle to the part 1, as shown at 3. The outwardly bent portion 3 carries a set screw 4 provided with a lock nut $5^a$. The bar 1 has openings $1^a$ to receive bolts 5.

A bar 6 having its lower end 7 similarly bent outward at an angle, also carries a set screw $4^a$ and a lock nut $5^a$. The bar 6 has openings $6^a$ to receive the bolts 5. Between the bars 1 and 6 is securely clamped a plate 8 of substantially the same thickness as the saw blade, having vertically slotted holes $8^a$, by which to adjust plate 8 lengthwise with relation to bars 1 and 6 and having its lower end notched in the middle, as at $8^b$, the lower corners being beveled as at $8^c$. Just above the angle formed by the meeting of the bar 1 and its lower end 3 and of the bar 6 and its lower end 7, there is provided in each of bars 1 and 6 a clearance notch 9 to accommodate the sidewise movement of the set when in place on the saw, as indicated in Fig. 3.

The function of plate 8, formed with a notch $8^b$, is to act as a gage against which the extreme point of the tooth is brought when the bars and handle of the swage are held at an angle of approximately 45° with a line connecting the points of the saw teeth, as shown in Fig. 3. This insures that the transverse bend of each tooth will begin at a predetermined distance down from the extreme point of the tooth.

Referring to Fig. 3, it will be noted that the sides of notches $8^b$ diverge, forming an obtuse angle between them, and that the natural or normal position of the notch 8<sup>b</sup> is with one of its sides resting flat on the back edge of the tooth, in which position, the handle of the tool forms an angle of approximately 45° with the "line of cut" or line of descent of the saw teeth. The "line of bend" across each tooth forms, therefore, an angle of approximately 45° with the line of descent of the saw teeth.

The amount of bend of the angle that the tip of the tooth makes with the plane of the saw blade is determined by the adjustable set screws 4 and 4<sup>a</sup>. When the ends of these set screws bring up against the side of the saw, the tooth has been bent a given or fixed amount, in other words, given a definite amount of "set."

By properly adjusting the set screws 4 and 4<sup>a</sup>, the instrument can be adapted to be passed from tooth to tooth, bending first on one side and then on the other, bending all the teeth exactly alike.

From the above description, it will be noted that the bending also takes place at a predetermined distance down from the point of the tooth, consequently there is no injury to the extreme points of the teeth. The action of the tool on the saw tends to compress slightly the outer steel of the saw blade along the line of bend, giving a closer texture and better quality to the outer face of the set teeth.

It will be further noted that the instrument is so designed that it will be normal and natural to bend the tooth at an angle approximately 45° to both the line of cut and the descent of the saw, a very desirable feature, eliminating to a great extent the side friction exerted against the points of the teeth when the saw is in use, and thereby avoiding the "crowding" of the saw to one side or the other and the consequent imperfect sawing that is common on many classes of timber where saws are used in which, by reason of imperfect setting, side friction exists.

If, for especially accurate work, it is desired to use the ordinary set gage, the operation of my improved saw set will not interfere with the saw of the ordinary gage or wrench farther back on the tooth, the ordinary gage in this case being used simply for straightening the tooth. Heretofore the use of the wrench right at the points of the teeth often resulted in dulling them.

Having described my invention, what I claim and desire to secure by Letters Patent, is:—

In a saw set, the combination with a bar having its lower end bent outwardly and carrying a set screw, of a similar bar carrying a set screw and bolted to said first-mentioned bar, each of said bars formed with a clearance notch at one side and located above the junction of said bars, a plate lying wholly between said bars, said plate having the middle part of its lower end formed with a V-shaped notch adapted to fit over the point of the saw tooth to be set, the upper extremity of said notch being above the bend of said bars, the lower corner of said plate being beveled to form a clearance notch, and means for longitudinally adjusting said plate relative to said bars.

In testimony whereof, I affix my signature in presence of two witnesses.

EDWARD C. MERSHON.

Witnesses:
WM. P. POWELL,
G. G. RHINWAULT.

---

Copies of this patent may be obtained for five cents each, by addressing the "Commissioner of Patents, Washington, D. C."